US006666063B2

(12) United States Patent
Pick et al.

(10) Patent No.: US 6,666,063 B2
(45) Date of Patent: Dec. 23, 2003

(54) PROCESS AND SYSTEM FOR PRODUCING METAL SHEETS

(75) Inventors: Gerhard Pick, Waeschenbeuren (DE); Otto Kurz, Hattenhofen (DE); Alfred Bareis, Uhingen (DE); Thomas Moeller, Goeppingen (DE)

(73) Assignee: Schuler Pressen GmbH & Co. KG, Goeppingen (DE)

( * ) Notice: Subject to any disclaimer, the term of this patent is extended or adjusted under 35 U.S.C. 154(b) by 0 days.

(21) Appl. No.: 09/836,261

(22) Filed: Apr. 18, 2001

(65) Prior Publication Data

US 2002/0005056 A1 Jan. 17, 2002

(30) Foreign Application Priority Data

Apr. 18, 2000 (DE) .......................................... 100 19 368

(51) Int. Cl.[7] .............................. B21D 1/02; B21D 28/06
(52) U.S. Cl. .............................. 72/131; 72/160; 72/324; 83/29; 83/36; 83/406; 83/917; 219/121.67; 219/121.72
(58) Field of Search .......................... 72/324, 160, 131; 83/733, 36, 29, 151, 406, 917; 29/598, 609; 219/121.72, 121.67

(56) References Cited

U.S. PATENT DOCUMENTS

| 3,496,754 A | * | 2/1970 | Worley ........................ 72/339 |
| 3,571,873 A | * | 3/1971 | Muller |
| 3,603,191 A | * | 9/1971 | Muller |
| 4,108,031 A | * | 8/1978 | Dangelmaier |
| 4,331,049 A | * | 5/1982 | Bergmann |
| 4,461,068 A | * | 7/1984 | Schneider |
| 4,846,033 A | * | 7/1989 | Uehlinger |

FOREIGN PATENT DOCUMENTS

GB 2361657 * 10/2001

* cited by examiner

*Primary Examiner*—Daniel C. Crane
(74) *Attorney, Agent, or Firm*—Crowell & Moring LLP

(57) ABSTRACT

A process system and produces metal sheets, including electric sheets, and uses at least one sheet machining unit, particularly a notching device. One or more linear transfer devices or more one sheet stacking devices, one or more sheet feeding unit and one or more sheet removal devices are being configured for stacking at least one sheet metal blank, centering and/or orienting at least one sheet metal blank, (c) at least one of notching at least one sheet metal blanks, separate and/or remove one or more interior sheet metal parts, and deposit the one or more notched sheet metal blanks and/or depositing the one or more interior sheet metal parts.

6 Claims, 17 Drawing Sheets

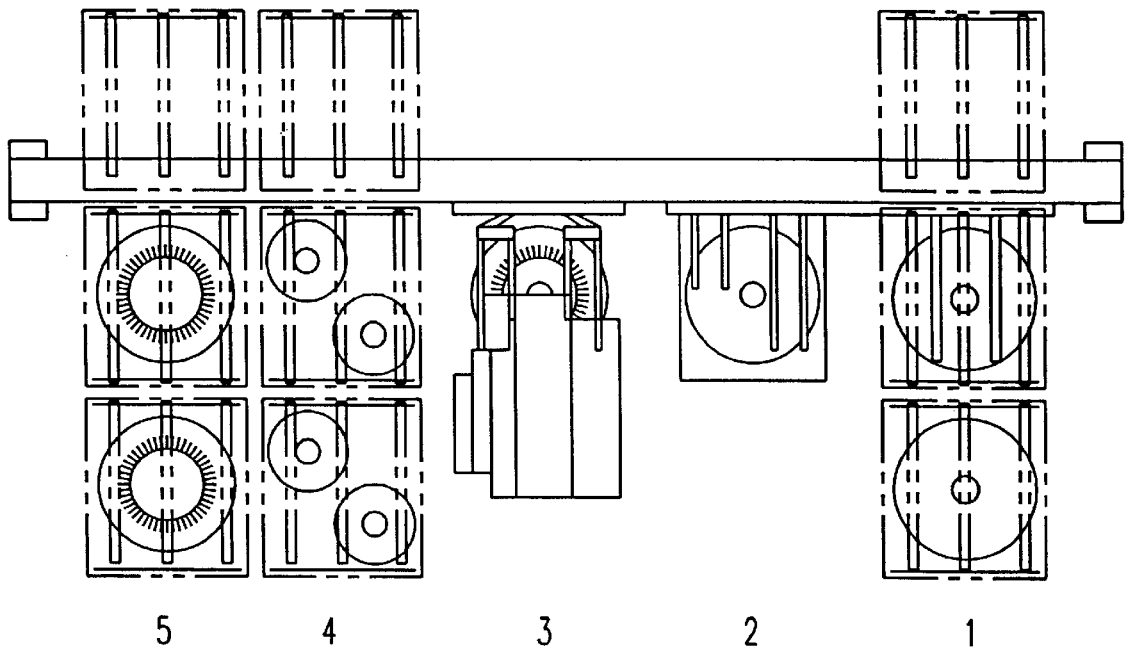

| 1. OPERATION | 2. OPERATION |
|---|---|
| STATION 1: DESTACKING BLANKS<br>STATION 2: CENTERING AND ORIENTATING BLANKS ETC.<br>STATION 3: NOTCHING STATOR AND SEPARATING ROTOR BLANKS<br>STATION 4: STACKING ROTOR BLANKS<br>STATION 5: STACKING STATOR LAMINATIONS | STATION 1: DESTACKING ROTOR BLANKS<br>STATION 2: CENTERING AND ORIENTATING ROTOR BLANKS ETC.<br>STATION 3: NOTCHING ROTOR<br>STATION 4: IDLE STATION<br>STATION 5: STACKING STATOR LAMINATIONS |

FIG.1

STATION 1: DESTACKING BLANKS
STATION 2: CENTERING AND ORIENTATING BLANKS ETC.
STATION 3: NOTCHING STATOR AND SEPARATING ROTOR BLANKS
STATION 4: STACKING STATOR LAMINATIONS
STATION 5: NOTCHING ROTOR
STATION 6: STACKING ROTOR LAMINATIONS

STATION 1: DESTACKING BLANKS
STATION 2: CENTERING AND ORIENTATING BLANKS ETC.
STATION 3: NOTCHING STATOR AND SEPARATING ROTOR BLANKS
STATION 4: STACKING STATOR LAMINATIONS
STATION 5: NOTCHING ROTOR
STATION 6: PUNCHING FINAL SHAFT HOLE
STATION 7: STACKING ROTOR LAMINATIONS

STATION 1: DESTACKING BLANKS
STATION 2: CENTERING AND ORIENTATING BLANKS ETC.
STATION 3: 1. OPERATION
NOTCHING STATOR AND SEPARATING ROTOR BLANKS
REMOVE STATOR
2. OPERATION
NOTCHING ROTOR
REMOVE ROTOR
STATION 4: STACKING STATOR LAMINATIONS
STATION 5: PUNCHING FINAL SHAFT HOLE
STATION 6: STACKING ROTOR LAMINATIONS

| | OPERATION | AUTOMATIC TURNSTILE MACHINE | | COMPARISON OF CYCLE TIMES | | | |
|---|---|---|---|---|---|---|---|
| | | | | AUTOMATIC LINEAR MACHINE | | | |
| | | ONE BLANKING DEVICE | TWIN | ONE BLANKING DEVICE | TWIN | ONE BLANKING DEVICE, TWO ROWS, CONVENTIONAL | ONE BLANKING DEVICE, TWO ROWS, NEW SYSTEM |
| 1 | BLANKING STATOR SHEET, SEPARATING ROTOR BLANK | X | X | X | X | X | X |
| 2 | SIDE UP, TENSION UP | A | A | A | A | A | A |
| 3 | MOVE GRIPPER INTO BLANKING DEVICE | | | A1 | A1 | A1 | |
| 4 | PICK UP SHEETS AND BLANKS | | | A2 | A2 | A2 | |
| 5 | SHEET AND BLANK TRANSPORT (CIRCULAR/LINEAR) | B | B | B | B | B | B |
| 6 | INSERT BLANK, SLIDE DOWN, TENSION DOWN | C | C | C | C | C | C |
| 7 | RESET ROTOR PRODUCTION | X | | X | | | |
| 8 | BLANK ROTOR | X | | X | | X | X |
| 9 | SLIDE UP, TENSION UP | D | | D | | D | D |
| 10 | MOVE GRIPPER INTO BLANKING DEVICE | | | D1 | | D1 | |
| 11 | PICK UP SHEETS AND BLANKS | | | D2 | | D2 | |
| 12 | SHEET AND BLANK TRANSPORT (CIRCULAR/LINEAR) | E | | E | | E | E |
| 13 | INSERT BLANK SLIDE DOWN, TENSION DOWN | F | | F | | F | F |
| 14 | RESET TO NEXT ORDER | X | X | X | X | X | X |

FIG.6

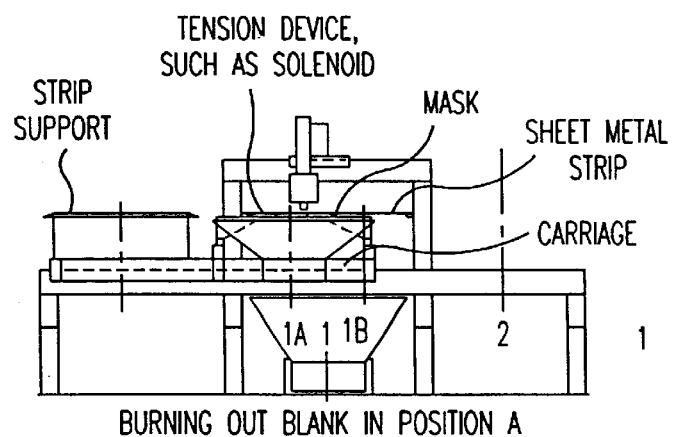
BURNING OUT BLANK IN POSITION A
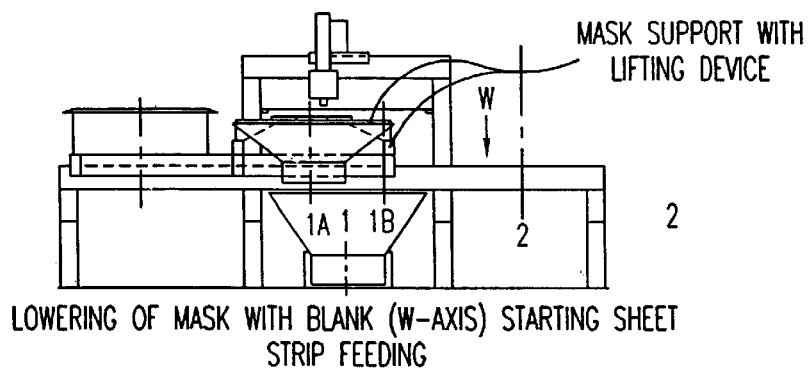
LOWERING OF MASK WITH BLANK (W-AXIS) STARTING SHEET STRIP FEEDING
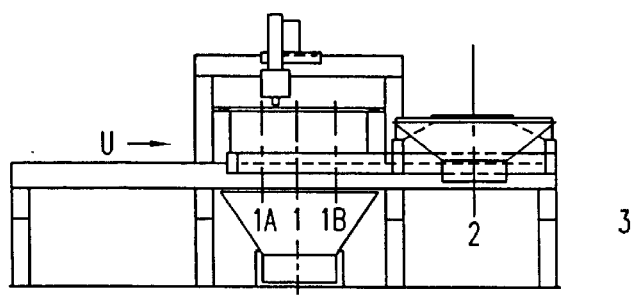
MOVING CARRIAGE, (U-AXIS); MOVING MASK IN DISCHARGE POSITION 2
MOVING-ALONG STRIP SUPPORT IN POSITION 1
FIG.15A

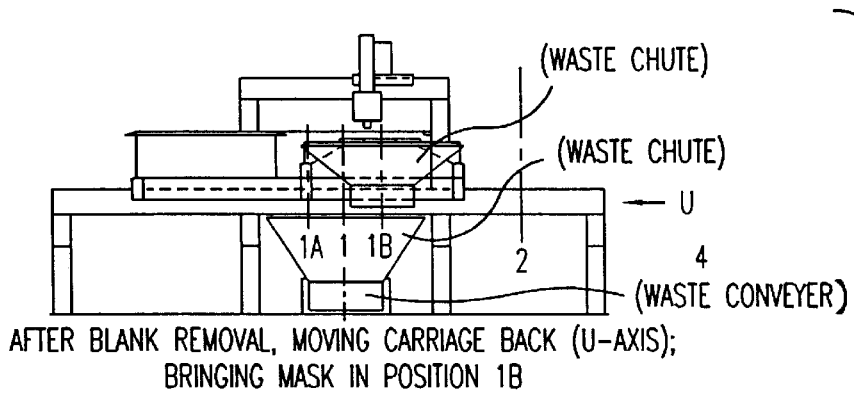
AFTER BLANK REMOVAL, MOVING CARRIAGE BACK (U-AXIS);
BRINGING MASK IN POSITION 1B
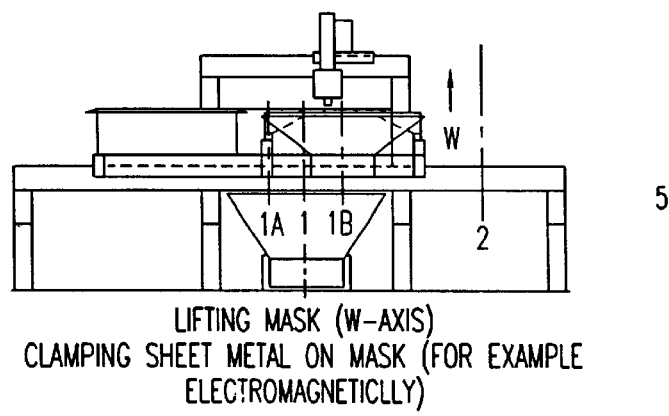
LIFTING MASK (W-AXIS)
CLAMPING SHEET METAL ON MASK (FOR EXAMPLE ELECTROMAGNETICLLY)
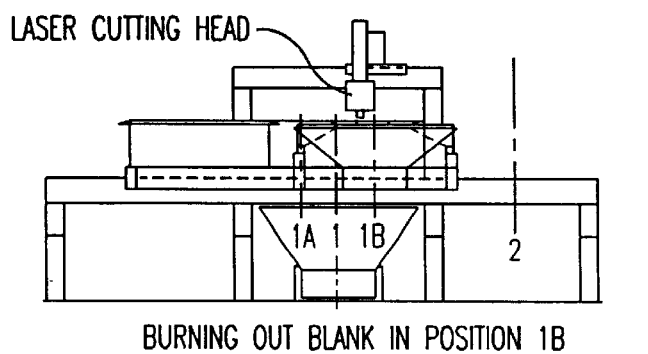
BURNING OUT BLANK IN POSITION 1B
FIG. 15B

US 6,666,063 B2

PROCESS AND SYSTEM FOR PRODUCING METAL SHEETS

BACKGROUND OF THE INVENTION

This application claims the priority of German application 100 19 368.4, filed Apr. 18, 2001, the disclosure of which is expressly incorporated by reference herein.

The present invention relates to a process and a system to provide, for example, electric sheets. Processes of this type for the production of electric sheets of small quantities are known, for example, as single notching processes. Here, a differentiation is made between two basic processes which are both known. On one hand, there is the single notching process with a circular feeding; on the other hand, there is the single notching process with a linear feeding. When the circular feeding method is used, it is a disadvantageous that no pallet handling is permitted. Furthermore, as far as the topic of supplying and delivering blanks and metal sheets is concerned, stacking mandrel and pallet handling are known. In this case, for example, blanks which have a finished outer contour and a finished or standard opening are used as the starting material. Also, the use of twin notching presses is known.

If single notching presses according to the known processes are used, however, it is a disadvantage that a large number of individual machining steps are required to reach the desired result. This process is therefore very time-consuming. The known use of single notching presses of the circular feeding variant is less time-consuming but has the initially mentioned disadvantages. The use of twin notching presses of the variant using a circular and linear feeding is also known. In this case, it is particularly disadvantageous that, as a result of the use of two notching presses, more space as well as more capital cost are used. Another disadvantage consists of the resulting longer retooling times. Although the use of automatic twin turnstile machines represents the fastest type of manufacturing if only the direct manufacturing of metal sheets is considered, the considerable disadvantage is the fact that stacking mandrels are required which have to be manufactured for every application as parts-dependent accessories by singe-piece production. This is very expensive and increases the set-up and take-down times.

SUMMARY OF THE INVENTION

It is, therefore, an object of the present invention to provide a process and a system which avoid the above-mentioned disadvantages and produce metal sheets with a higher flexibility, shorter set-up and take-down times and at lower costs.

According to the invention, this object has been achieved in that a process and a system for producing metal sheets, particularly electric sheets, are provided, in which at least one sheet cutting unit, particularly a blanking device, at least one linear transfer device, at least one sheet stacking device as well as at least one sheet feeding unit and at least one sheet removal unit carry out the following process steps. At least one sheet metal blank is stacked and centered and/or oriented. The at least one sheet metal blank is notched and/or at least one interior sheet metal part is separated and/or removed. The notched sheet metal blank or blades is or are deposited and/or the at least one interior sheet metal part is deposited.

Such a system and the process are very flexible in comparison to the prior art.

BRIEF DESCRIPTION OF THE DRAWINGS

Other objects, advantages and novel features of the present invention will become apparent from the following detailed description of the invention when considered in conjunction with the accompanying drawings, wherein:

FIG. 1 is a schematic view of a conventional single notching device;

FIG. 6 is a comparative table showing the cycle times of the prior art and the new system;

FIG. 15 is a series of schematic view of a laser blank cutting system with a blank removal device—machining of wide strip sheet in a zigzag cut.

DETAILED DESCRIPTION OF THE DRAWINGS

Figure 2:
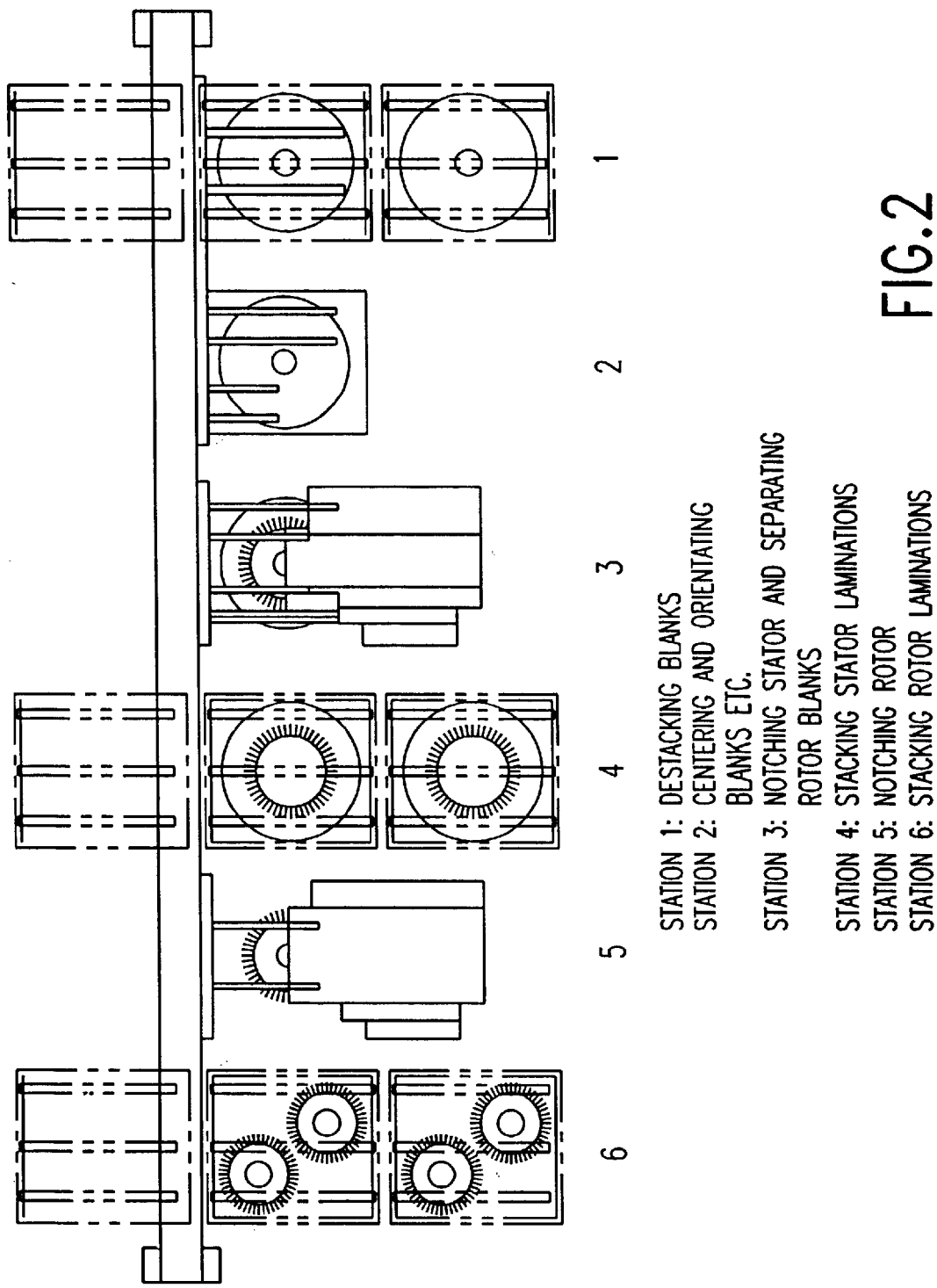
FIG. 2 is a schematic view of a conventional twin notching device.
Figure 3:
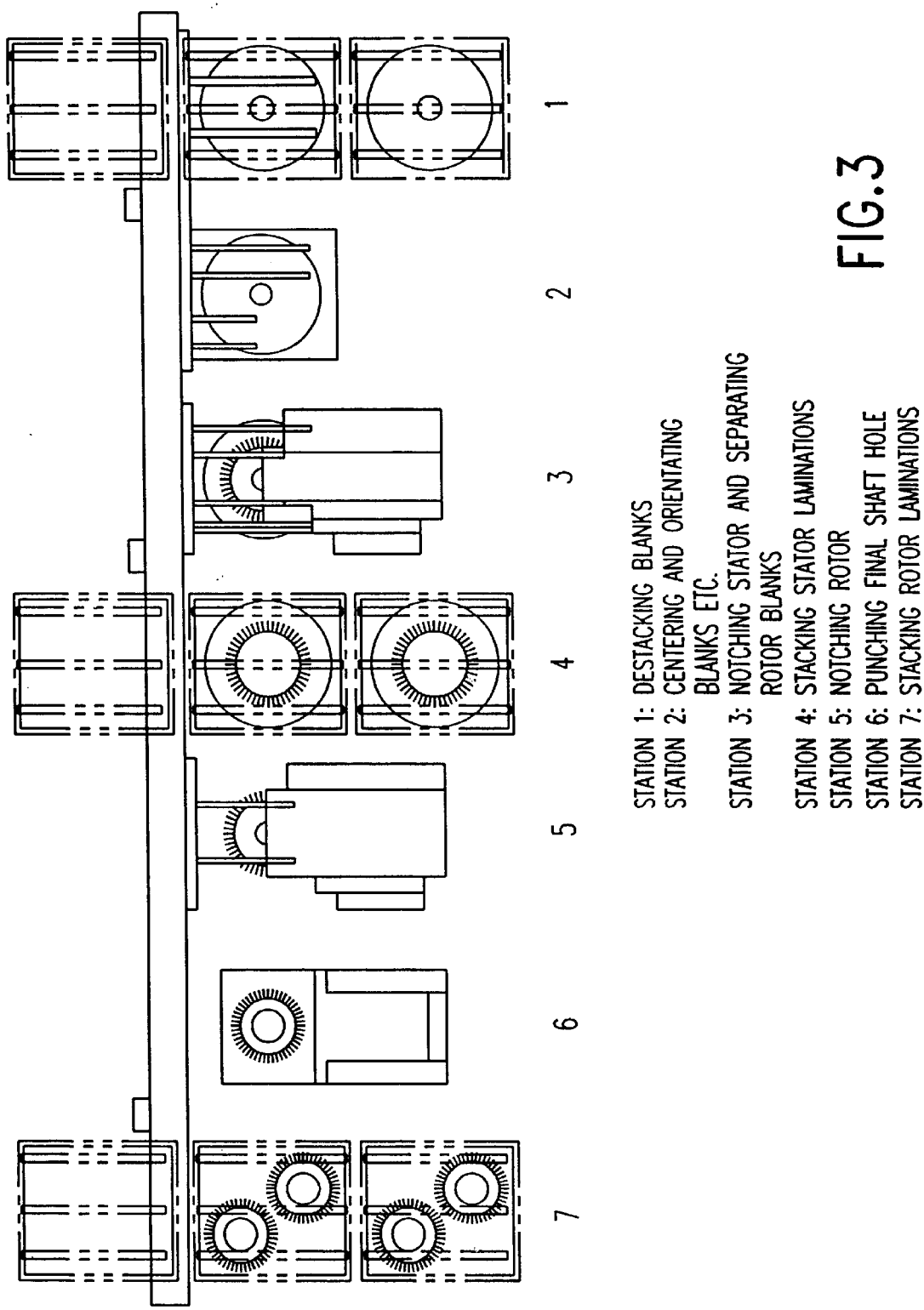
FIG. 3 is a schematic view of a conventional twin notching device with punching of final shaft hole.

The embodiment according to FIG. 1 is a prior art single notching device. FIG. 2 is a prior art twin notching device according to the prior art and FIG. 3 shows a prior art twin notching device with punching of a final shaft hole.

Figure 4:
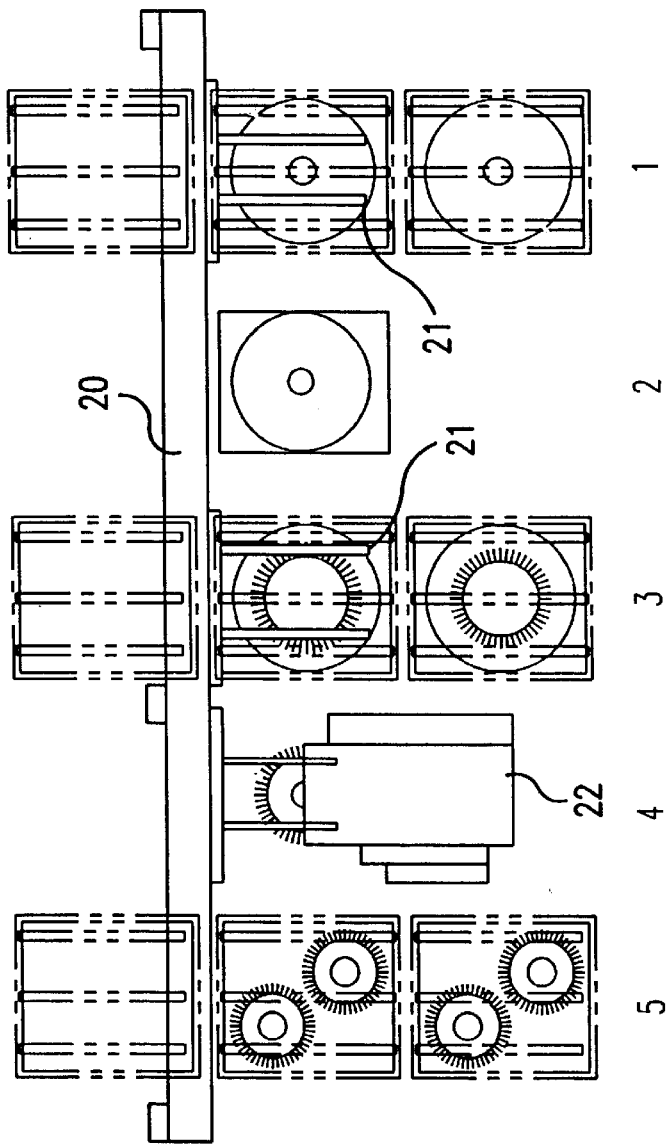
FIG. 4 is a schematic view of an embodiment of the present invention.

The new system is shown in the cost column of the comparative table of FIG. 6 and is divided there with respect to the required operating steps. The comparison with the prior art illustrates the advantages of the new system which is illustrated in FIG. 4, showing at station 1 a metal sheet feeding device for stacked blanks.

The finished electric sheets are placed on the stacking stations 4, 5. The rotors are situated on stacking station 5; the stators are situated on stacking station 4 3. The sheet cutting unit, which in this embodiment is constructed as a notching device 22, is situated between stacking stations 4 and 5. Between the sheet feeding unit 1 and the stacking station 4, the orienting station 2 is situated which is used for orienting and centering the blanks. A linear transfer device 20 extends essentially transversely with respect to the entire system and is arranged above the sheet stacking devices such that, by way of magnetic grippers 21, the blanks are conveyed from one station to the next.

Figure 5:
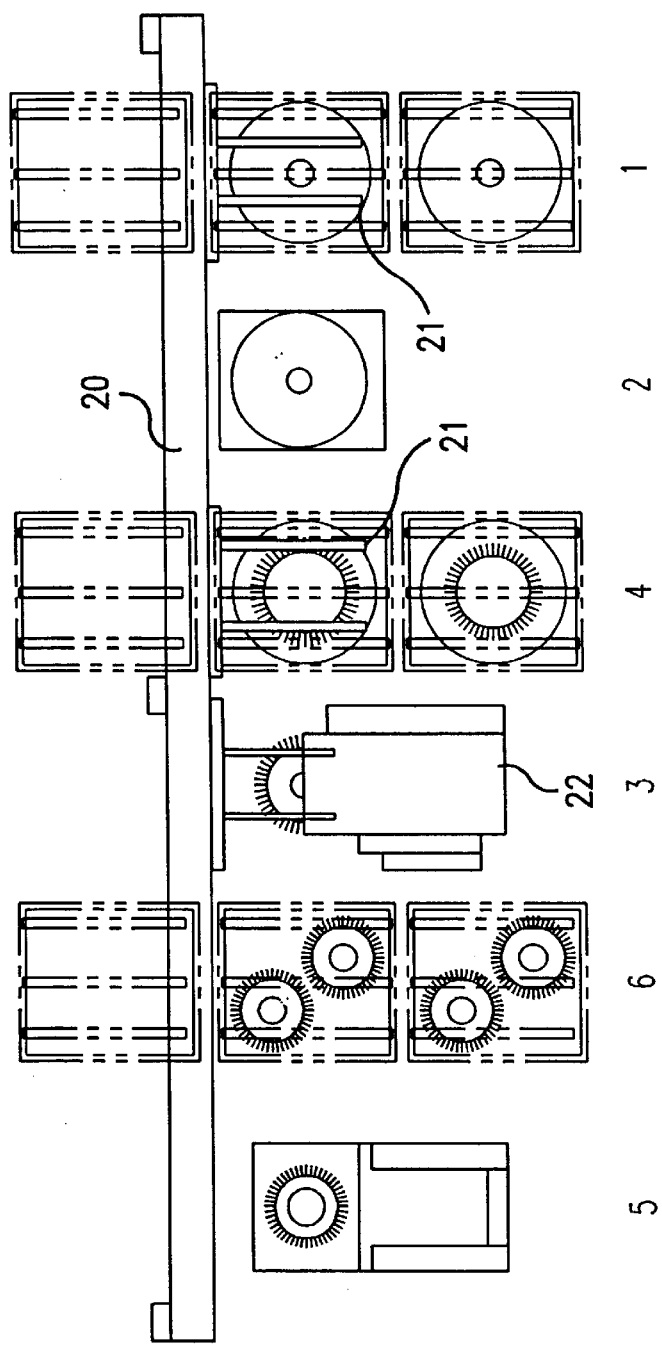
FIG. 5 is a schematic view of the embodiment shown in FIG. 4 with punching of final shaft hole.

In the new system shown in FIG. 5, a sheet feeding unit is under station 1, at which the blanks are stacked. The finished electric sheets are stacked on stacking stations 4, 6. The rotors are situated on stacking station 6; the stators are situated on stacking station 4. Between stacking stations 4, 6, the numerically controlled notching device 22 is arranged at station 3 for making several rows of notches in a chucking to substantially reduce the cycle times in comparison to conventional approaches. Per cycle, one finished rotor sheet and one finished stator sheet can be produced. Between the sheet feeding unit 1 and the stacking station 4, the orienting station 2 is arranged which is used for orienting and centering the blanks. A linear transfer device 20 extends essentially transversely to the entire system and is arranged above the sheet stacking devices such that, with magnetic grippers 21, the blanks are conveyed from one station to the next. At station 5 at the end of the system shown in FIG. 5, the final shaft holes of the rotors are punched.

The table according to FIG. 6 demonstrates that the set-up and take-down times, for example, are much shorter with the preset invention as compared with the prior art. Investment costs are also saved because only one blanking press is required. In the variant which has a laser cutting system, even a complete manufacturing of the sheet metal parts can be carried out, which further improves the flexibility and the situation with respect to the set-up and take-down times and saves costs.

Figure 7:
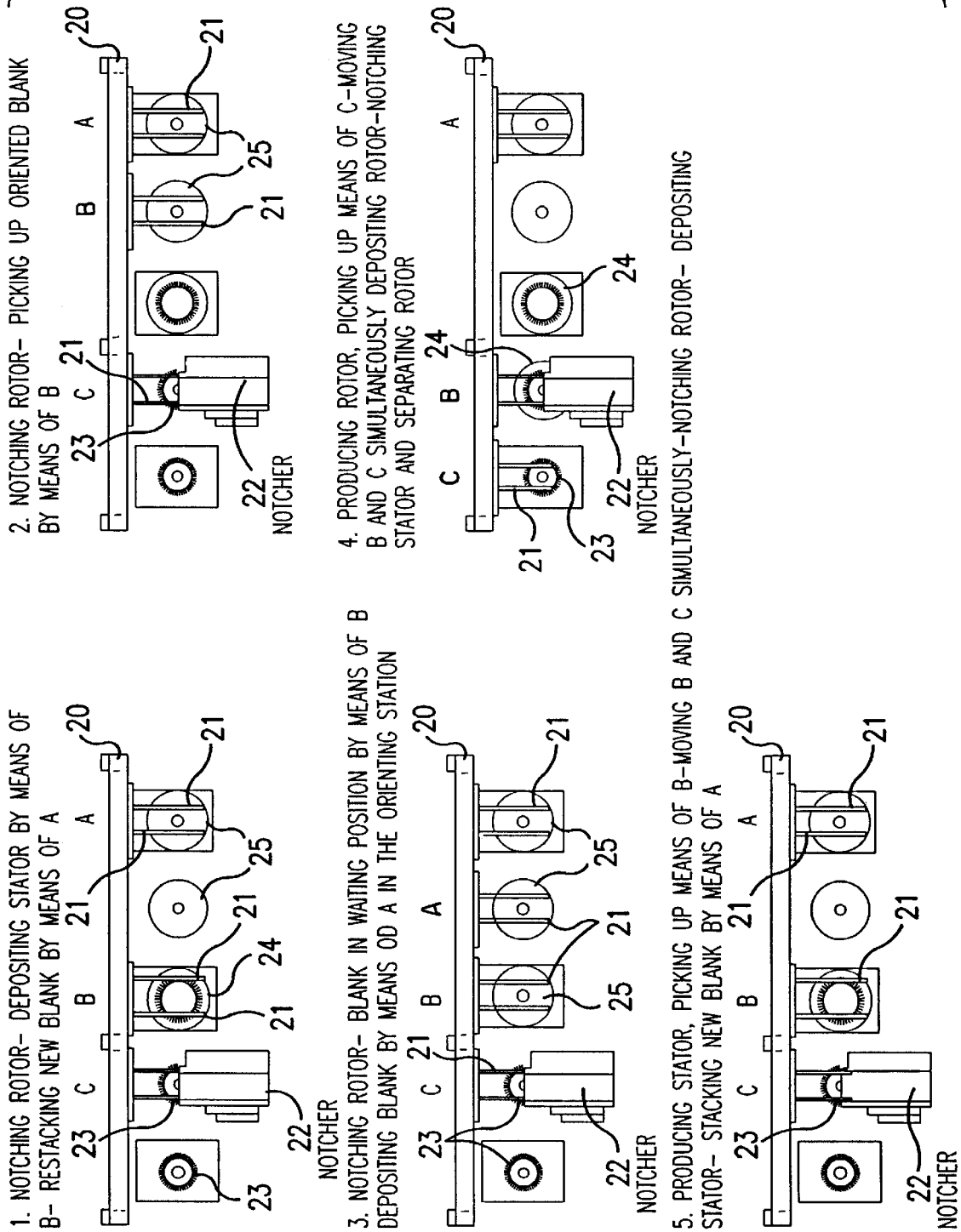
FIG. 7 is a series of schematic views of the process steps of the new system shown in FIG. 4.

FIG. 7 is a schematic of the process steps 1 to 5 of the new system according to FIG. 4. In process step 1, a new blank 25 is stacked in the gripper station A which can be displaced along the linear transfer device 20. This takes place by way of the magnetic grippers 21. In gripper station B, which is also displaceable along the linear transfer device 20, the magnetic grippers 21 deposit a stator 24 which is produced from a blank 25 in the notching device 22. A rotor 23 is just being manufactured in notching device 22 in the displaceable gripper station C. The process step 2 shows how, during the notching of the rotor 23 in the notching device 22 in station C, an oriented blank 25 is picked up by the magnetic grippers 21. In process step 3, the oriented blank 25 is deposited by the gripper station B containing the magnetic grippers 21 into the waiting position next to the notching device 22. At gripper station A, a new blank 25 is deposited into the orienting station. In process step 4, the finished rotor 23 is picked up by the gripper station C, which contains the magnetic grippers 21, and is deposited next to the notching device. Simultaneously, the gripper station B with the blank 25 moves out of the orienting station into the operating range of the notching device 22. The notching device 22 notches the stator and separates the rotor in process step 4. In process step 5, the finished stator is picked up by the gripper station B and is deposited next to the notching device. Simultaneously with gripper station B, gripper station C moves into the operating range of the notching device 22 over the rotor 23 which has been separated and is to be notched by the notching device 22. Then the operation is continued with the above-described process step 1.

Figure 8:
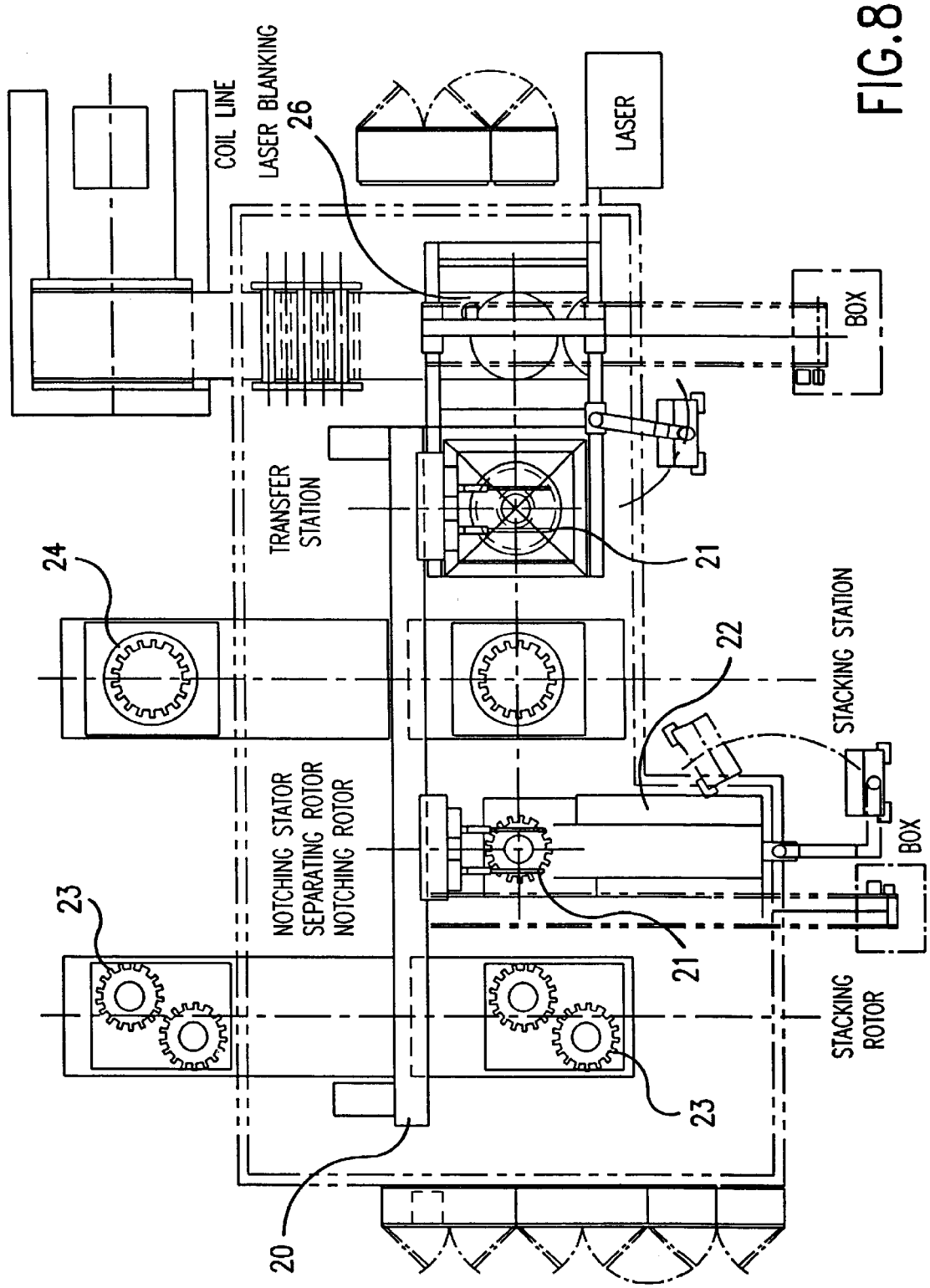
FIG. 8 is a top view of a system according to the present invention, in which the blank system is replaced by a coil line.

FIG. 8 illustrates an alternative embodiment in which, instead of stacking station 1 and orienting station 2 of FIG. 4, a laser cutting system 26 is provided. Here the gripper station A known from FIG. 7 is eliminated because the sheet is taken over directly by the blank transfer station of the laser system.

Figure 9:
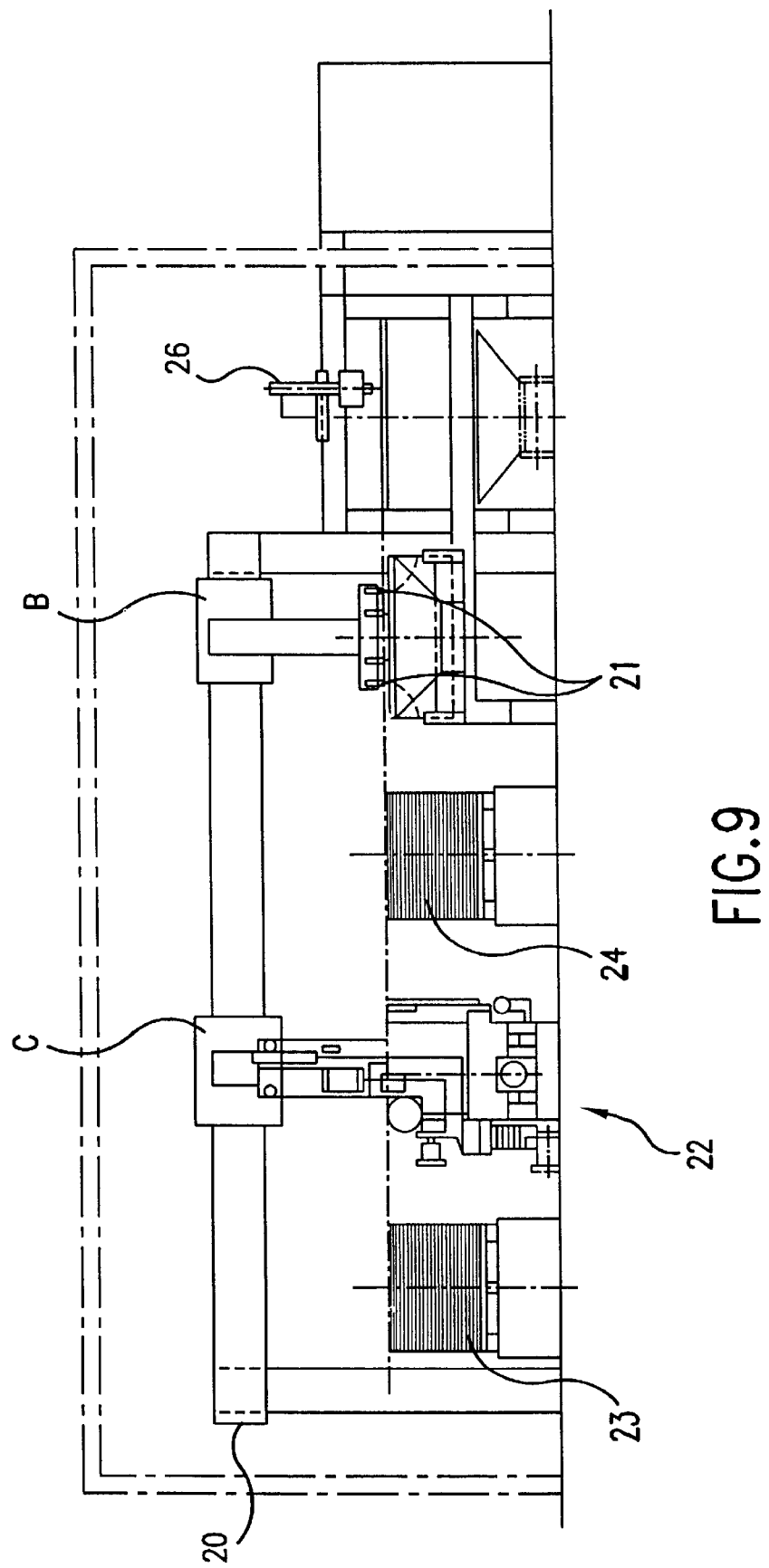
FIG. 9 is a front view of the system of FIG. 8.

FIG. 9 is a front view of the alternative embodiment of the laser system 26 is essentially arranged next to the linear transfer device 20. Below the linear transfer device 20, the rotors 23 and the stators 24 are visible on the stacking stations known from FIG. 4 between which the notching device 22 is arranged. The magnetic grippers 21 are arranged on the gripper station B fastened to the linear transfer device. In the illustration of FIG. 9, the gripper station is situated in the operating range of the notching device 22.

Figure 10:
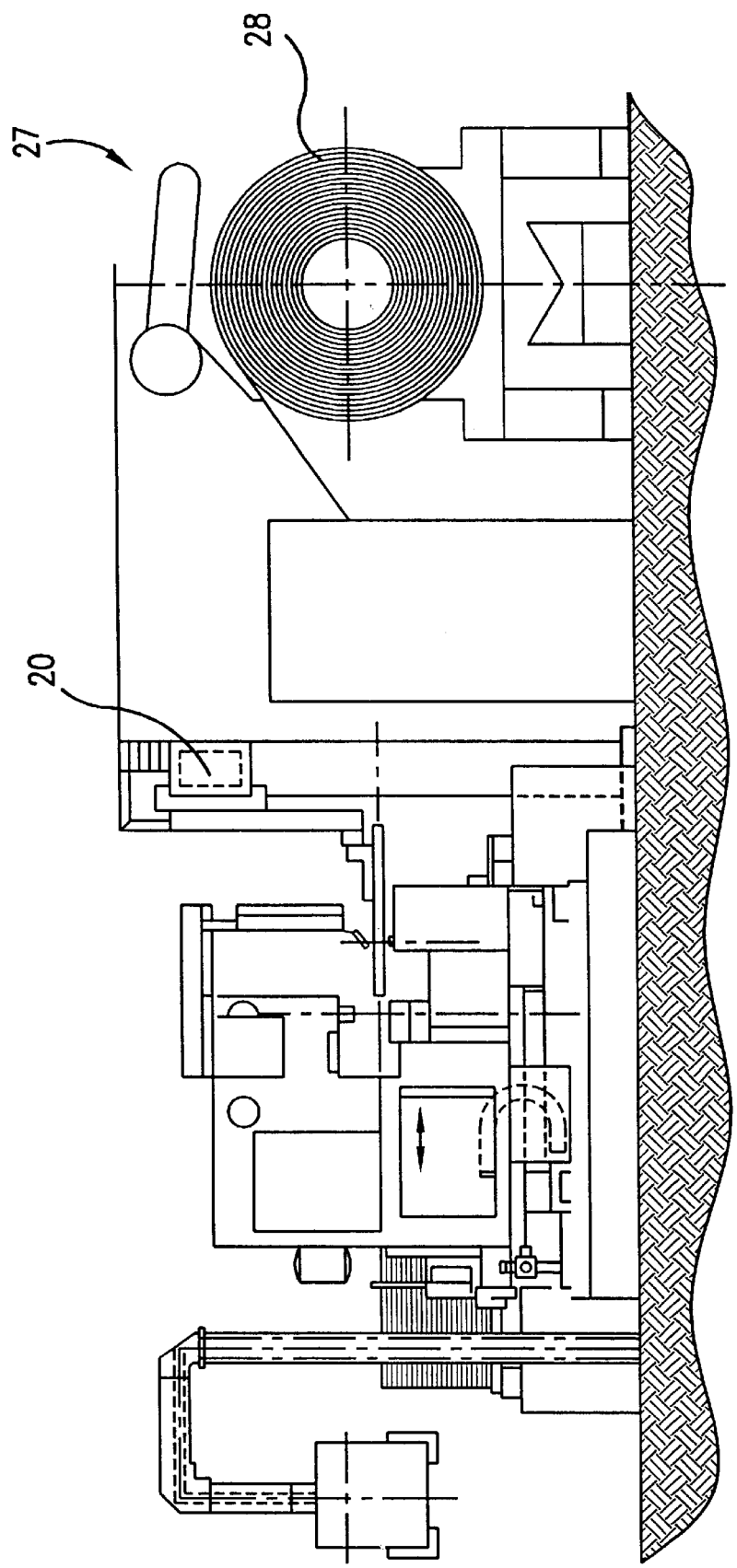
FIG. 10 is a side view of the system of FIG. 8.

FIG. 10 is a side view of the system shown in FIG. 8, in which the arrangement of the decoiler 27 containing the sheet metal strip 28 is shown with respect to the linear transfer device 20.

Figure 11:
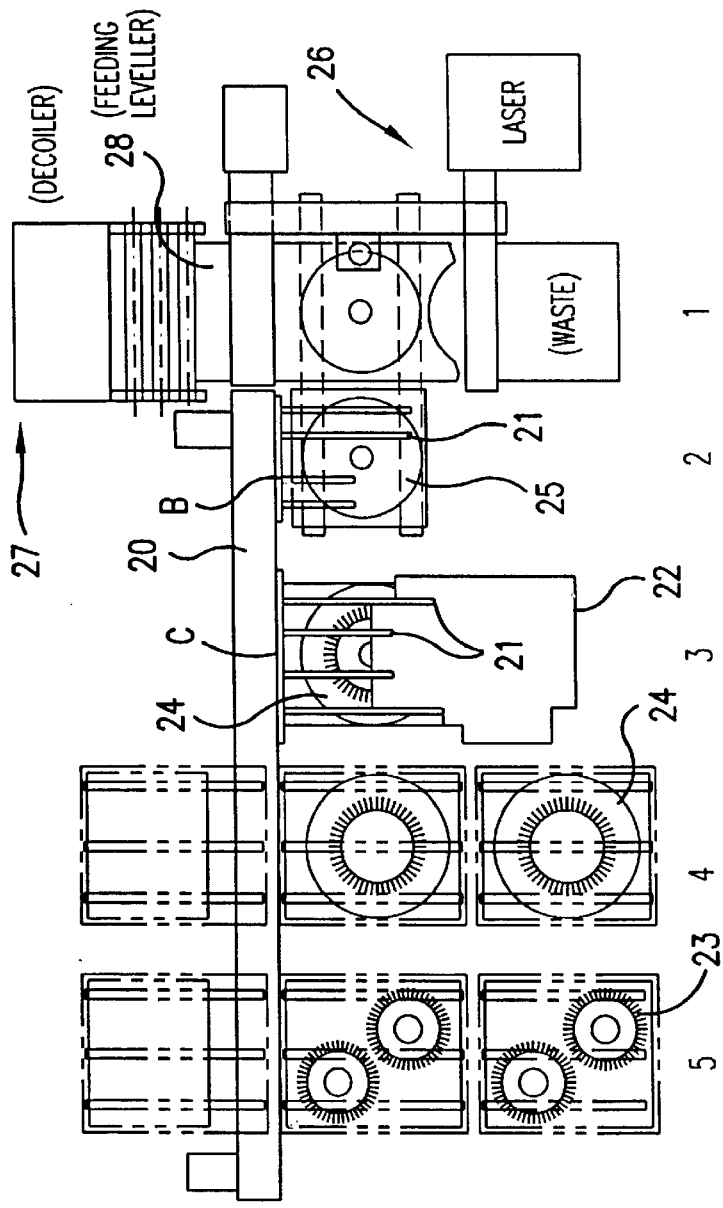
FIG. 11 is a view of an embodiment of the present invention with a laser cutting system.
Figure 12:
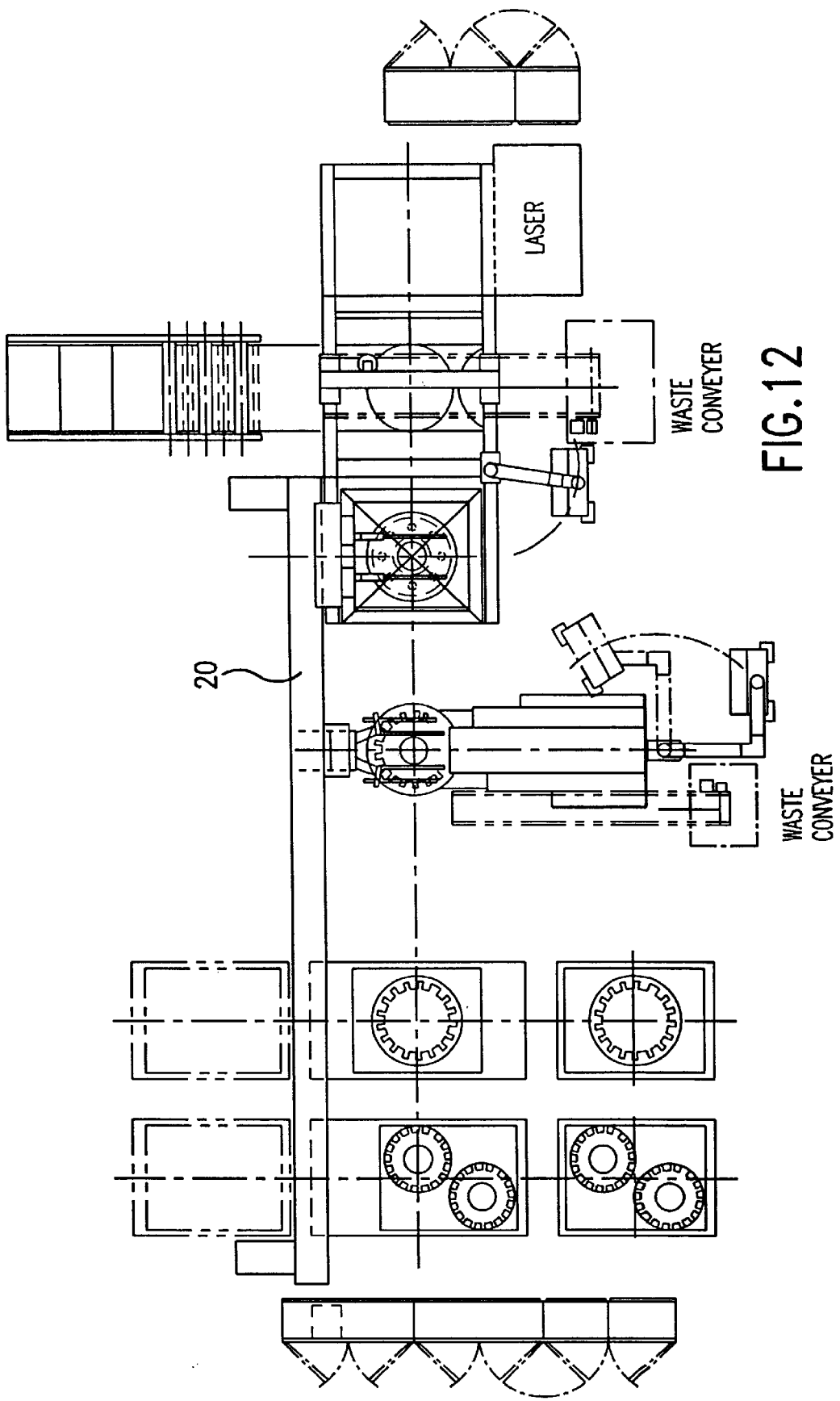
FIG. 12 is a top view of the system shown in FIG. 11.
Figure 13:
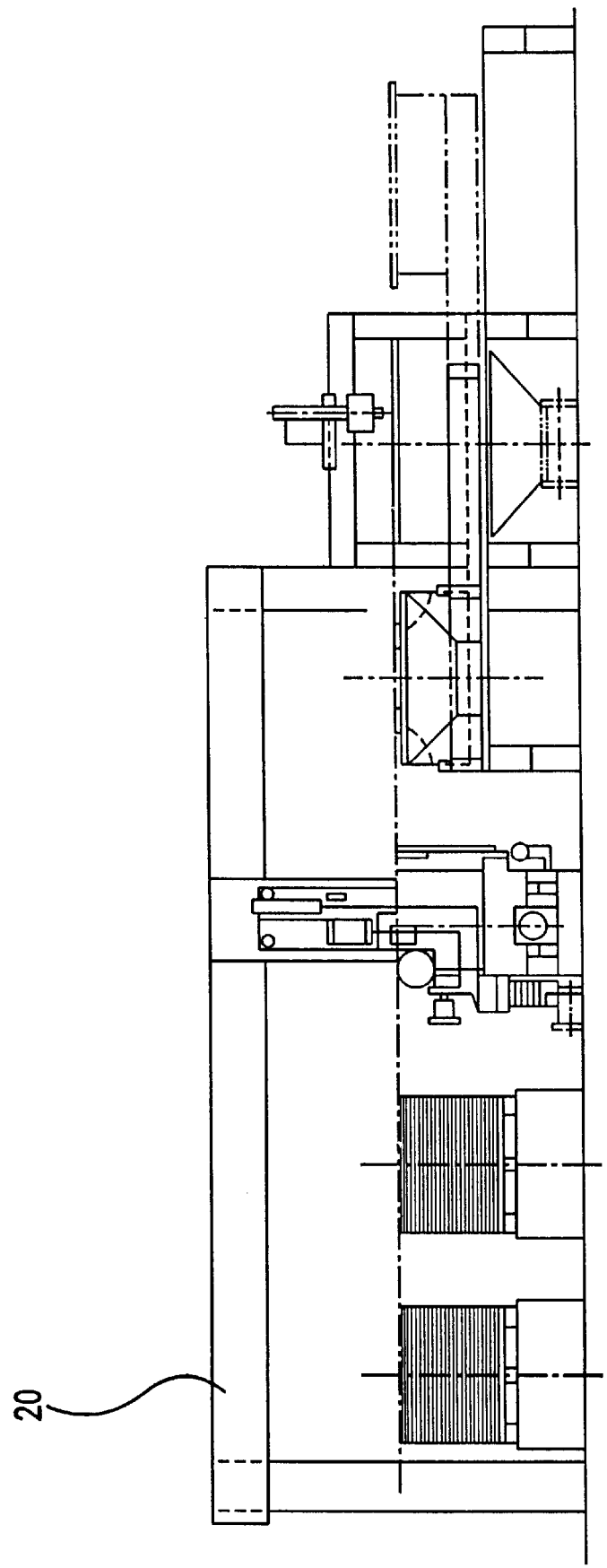
FIG. 13 is a front view of the system shown in FIG. 12.

FIG. 11 illustrates an embodiment with a laser cutting system 26. A sheet metal strip 28, which is disposed on the decoiler 27, is charged into the laser cutting system 26. A leveller, which levels the sheet metal strip, is used as a feeding device. The laser cutting system 26 cuts the final outer contour as well as the final shaft hole, including a wedge-shaped groove, which, in turn, results in saving and an increase of flexibility, because the known, and now no longer necessary blank systems require expensive tools which often take weeks to finish and result in high costs. The gripper station B arranged on the linear transfer device 20 conveys the blank 25 supplied by the laser system 26 into the operating range of the notching device 22, where the rotor and stator notches are blanked and the rotor sheet is separated. The gripper station C conveys stator and rotor sheets to the stacking stations 4, 5. In an alternative embodiment, shown in FIG. 11, the notching device 22 in station 3 is eliminated. The laser system takes over the complete machining of the blank to rotor and stator sheets. Although this embodiment has a somewhat less speed, the flexibility of the system is increased. FIGS. 12 and 13 are, respectively, top and front views of FIG. 11.

Figure 14:
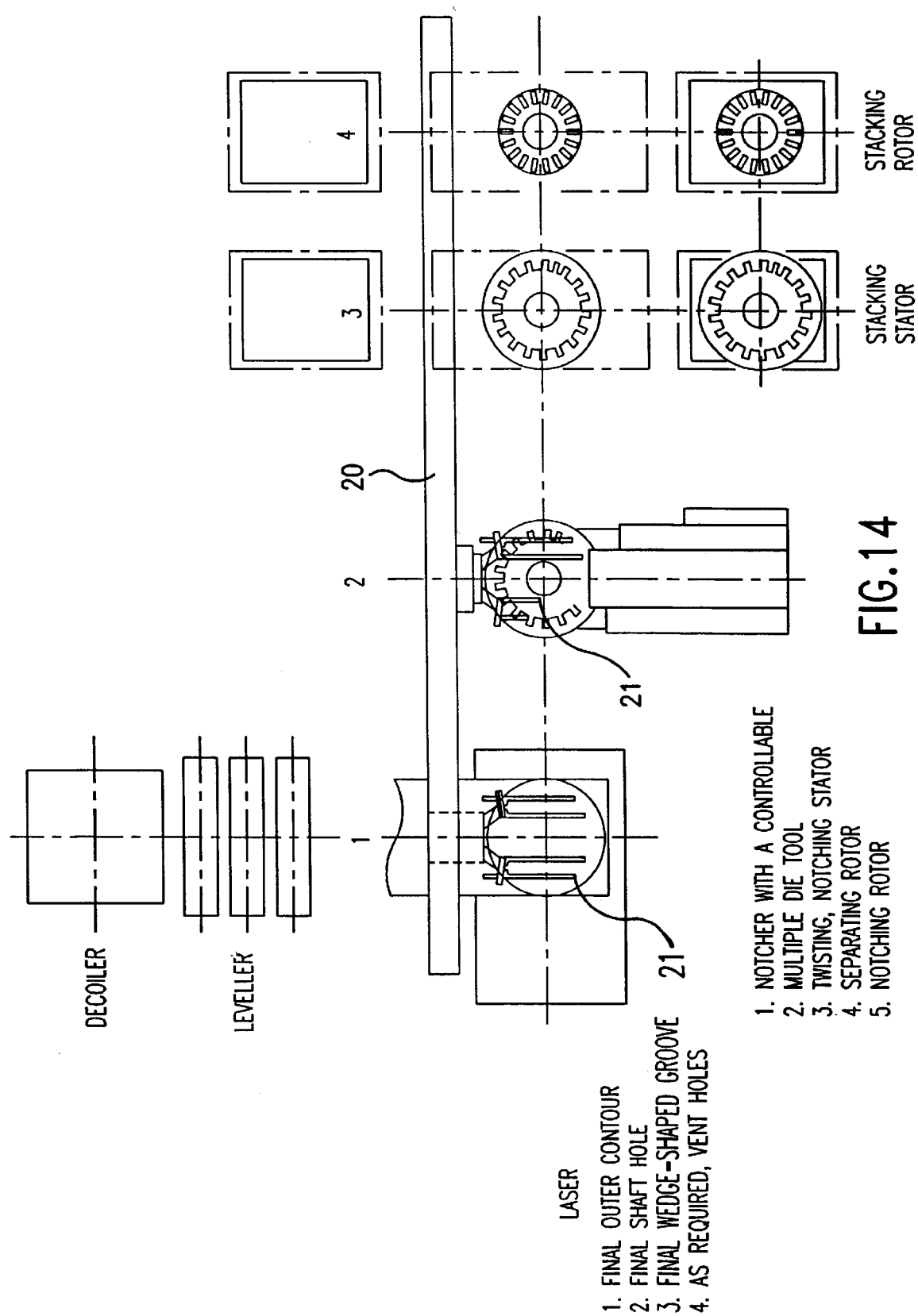
FIG. 14 is a view of an embodiment of the present invention which shows the path from the coil to the finished rotor and stator sheet on a linear automatic notching device with a decoiler and an automatic leveller.

FIG. 14 illustrates an embodiment which shows the path from the coil to the finished rotor and stator sheet on a linear automatic notching device with a decoiler and an automatic leveller.

FIG. 15 is a view of a laser blank cutting system with a blank removal device for machining of wide strip sheet metal in a zigzag cut. It is used for producing sheet metal parts which, by way of a laser cutting system, are burnt out of a sheet metal strip, particularly for producing electric sheets and for producing blanks for a further machining to electric sheets. In this mask, tensioning devices are arranged for holding and positioning the sheet metal strip. The tensioning devices are preferably constructed of solenoids. In an alternative embodiment, the tensioning devices consist of permanent magnets or of vacuum suction devices. With respect to the tool contour, the contour of the mask is arranged in a setback manner. For possibly required vent holes, wedge-shaped grooves, clamp notches or stator markings, the mask is provided with recesses so that the laser beam can penetrate unhindered the material to be penetrated. When the material is then liquefied, the burnt-out residue can fall downward unhindered. Below the cutting system, waste chutes are arranged which guide the burnt-out residue to a waste conveyer.

The above-mentioned mask is arranged on a carriage and can be vertically adjusted (W). When the blank is completely burnt out, the above-mentioned mask is lowered and the carriage then moves into the discharge position (U). Simultaneously, a strip support arranged on the carriage moves into the table of the laser cutting machine. The strip feeding can be started as soon as the mask is lowered and the carriage is moving. The strip support prevents the sheet metal strip from being lowered or hooked into the recess which is formed by the moving-away of the mask.

During the feeding of the strip, the burnt-out blank is removed in the discharge position. Then the carriage returns into the table of the laser cutting machine. When the strip feeding has been concluded, the mask moves up again and the sheet metal strip is tensioned again and the next blank is burnt out. The moving axis of the carriage (U) is freely programmable. The carriage can move successively to different positions. In this manner, blanks can be produced in a zigzag cut as illustrated in FIG. 16.

Furthermore, by means of the laser cutting machine according to FIG. 15, not only blanks can be produced, but it is also possible to produce finished rotor and stator sheets as well as finished segments. It is also contemplated as within the scope of the present invention to lift the above-mentioned mask upward over the table in order to remove the workpiece from above by means of a corresponding gripper. For this purpose, the laser cutting head must be moved away for avoiding collisions with the gripper. The strip feeding starts when the mask has been lowered again. In an alternative embodiment, the mask can be arranged on a rotary table or a swivelling device. It is important, however, that the blank is immovably held for a secure further machining.

Figure 16:
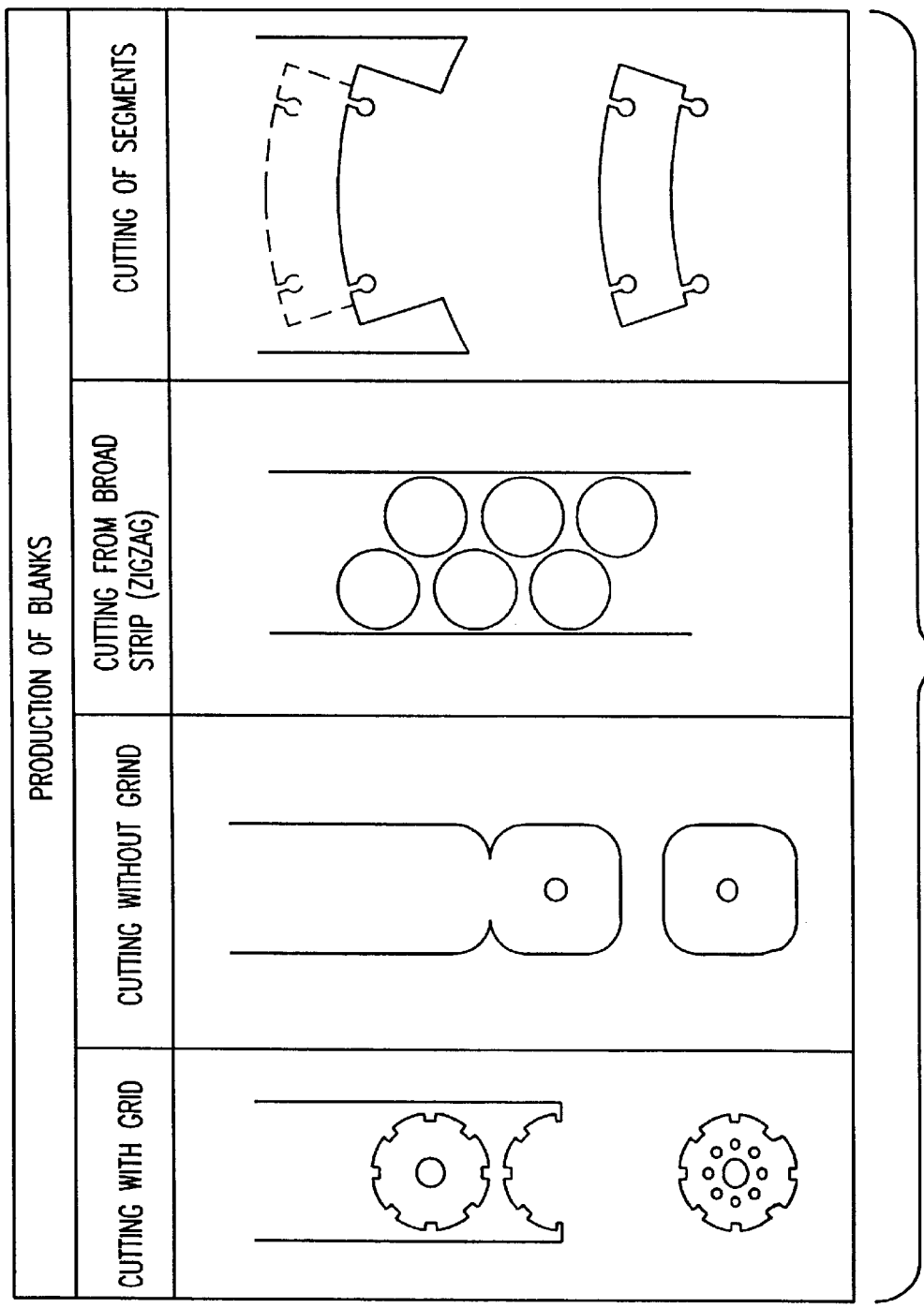
FIG. 16 is a view of several examples of finished blanks produced with the present invention.

FIG. 16 illustrates several examples of finished blanks producible by way of the present invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Process for producing metal sheets with at least one sheet cutting unit, at least one linear transfer device, at least one sheet stacking device, and at least one sheet feeding unit and at least one sheet removal device, the process comprising:
   a) stacking at least one sheet metal blank,
   b) at least one of centering and orienting the at least one sheet metal blank,
   c) notching at a notching location the at least one sheet metal blank, and separating and removing at least one interior sheet metal part from the at least one notched sheet metal blank,
   d) at least one of stacking at a first location the at least one notched sheet metal blank and stacking at a second location the at least one interior sheet metal part such that the notching location is located between the first and second location,
   e) using the linear transfer device to move the at least one sheet metal blank only linearly among steps a) to d) to produce the metal sheets,
   f) optionally using a laser apparatus for separating the at least one interior sheet metal part from the sheet metal blank in step (c).

2. The process according to claim 1, wherein the at least one sheet metal cutting unit comprises at least one of a notching device and a laser cutting unit.

3. The process according to claim 1, further comprising an inner-contour machining of the at least one interior sheet metal part.

4. The process according to claim 1, wherein the at least one sheet metal cutting device carries out at least one of notch machining, inner-contour machining and outer-contour machining.

5. System for producing metal sheets, including electric sheets, comprising at least one sheet machining unit, including a notching device, at least one linear transfer device, at least one sheet stacking device as well as at least one sheet feeding unit and at least one sheet removal device, the system being configured to (a) stack at least one sheet metal blank, (b) at least one of center and orient at least one sheet metal blank, (c) notch at least one sheet metal blank at a notching station, and separate, optionally with a laser, and remove at least one interior sheet metal part, and (d) at least one of stack the at least one notched sheet metal blank at a first location and stack the at least one interior sheet metal part at a second location with the first and second locations disposed with the notching station there between, with the at least one linear transfer device transferring the at least one sheet metal blank only in a linear path to the locations where (a) through (d) take place.

6. The system according to claim 4, wherein the sheet feeding unit has a coil line with a sheet leveler.

* * * * *